US012769721B2

(12) United States Patent
Mueller et al.

(10) Patent No.: US 12,769,721 B2
(45) Date of Patent: Oct. 20, 2026

(54) MANAGEMENT OF DIVERSE DATA ANALYTICS FRAMEWORKS IN COMPUTING SYSTEMS

(71) Applicants: David Mueller, San Jose, CA (US); Sebastian Mariano Salomon, San Marcos, CA (US); Riaz Uddin, Frisco, TX (US); Gregory Earl Hart, San Jose, CA (US); Omri Shiv, San Diego, CA (US); Khaled Bouaziz, Round Rock, TX (US); Guillaume Koch, San Diego, CA (US); Arnaud Flament, San Diego, CA (US)

(72) Inventors: David Mueller, San Jose, CA (US); Sebastian Mariano Salomon, San Marcos, CA (US); Riaz Uddin, Frisco, TX (US); Gregory Earl Hart, San Jose, CA (US); Omri Shiv, San Diego, CA (US); Khaled Bouaziz, Round Rock, TX (US); Guillaume Koch, San Diego, CA (US); Arnaud Flament, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/138,738

(22) Filed: Dec. 30, 2020

(65) Prior Publication Data

US 2021/0406246 A1 Dec. 30, 2021

Related U.S. Application Data

(60) Provisional application No. 63/043,708, filed on Jun. 24, 2020.

(51) Int. Cl.
*G06F 16/23* (2019.01)
*G06F 16/21* (2019.01)

(52) U.S. Cl.
CPC ........ *G06F 16/2365* (2019.01); *G06F 16/219* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 8,417,715 B1 * | 4/2013 | Bruckhaus | G06Q 10/04 | 705/26.1 |
| 2010/0306340 A1 * | 12/2010 | Williamson | G06Q 10/06 | 709/217 |

(Continued)

OTHER PUBLICATIONS

GitLab Docs. "GitLab Runner commands". Dec. 10, 2019 snapshot via Archive.org. URL Link: <https://web.archive.org/web/20191210090454/https://docs.gitlab.com/runner/commands/>. Accessed Dec. 2025. (Year: 2019).*

*Primary Examiner* — Irene Baker
(74) *Attorney, Agent, or Firm* — Ramin Mahboubian

(57) ABSTRACT

Data Analytics Engines can be provided as a "black-boxed" abstraction to their "users." This allows a user to mix and match analytical components if their input data matches the input requirement of the engine. Furthermore, by decoupling the Data Analytics Engine creation from the environment, a high degree of process automation, scalability, and improved maintainability can be achieved. As a result, Data Analytic engineers and Data Scientists can create reusable components for other scientists and business users, whereas the users need not know how the Engines are coded or the environment in which their engines will run, but only need to know the input schema of the data.

20 Claims, 9 Drawing Sheets

(56) References Cited

U.S. PATENT DOCUMENTS

| | | | | |
|---|---|---|---|---|
| 2014/0249865 | A1* | 9/2014 | Ghani | G06N 20/00 705/4 |
| 2014/0330745 | A1* | 11/2014 | Hampapur | G06Q 10/067 705/348 |
| 2017/0115964 | A1* | 4/2017 | Vadapandeshwara | G06F 8/60 |
| 2019/0042290 | A1* | 2/2019 | Bailey | G06F 9/45504 |
| 2019/0114200 | A1* | 4/2019 | Lee | G06Q 10/06 |
| 2019/0287208 | A1* | 9/2019 | Yerli | G06F 18/23213 |

* cited by examiner

```yaml
apiVersion: ai.platform.teradata.com/vibetal
kind: JobClass
metadata:
  name: tf2-training-keras
  version: v1
spec:
  jobCategoryName: training-category
  preemption: true
  input:
    artifactClassName: tf2-training-keras-input
    type: artifactReference
  output:
    artifactClassName: tf2-training-output
    type: artifactReference
  runnerSelectors:
    - name: tf2-cpu
      version: v1
    - name: tf2-gpu
      version: v1
```

FIG. 4

```yaml
apiVersion: ai.platform.teradata.com/vibetal
kind: ArtifactClass
metadata:
  name: tf2-training-keras-input
  version: v1
spec:
  artifactCategoryName: job-input-category
  properties:
    modelDefinition:
      artifactClassNames:
        - tf2-model-definition-keras
      type: artifactReference
    randomSeed:
      default: -1
      description: Random seed for TensorFlow initializers
      minimum: -1
      type: integer
    training:
      description: Parameters for training
      properties:
        batchSize:
          default: 1
          type: integer
        dataset:
          artifactCategoryName: dataset-category
          type: artifactReference
        deployableWarmStart:
          artifactClassNames:
            - tf2-deployable-hdf5
            - tf2-deployable-saved-model
          default: null
          type: artifactReference
```

FIG. 5

```yaml
apiVersion: "ai.platform.teradata.com/vibetal"
kind: Runner
metadata:
  name: pt-runner
  version: v1
spec:
  podSpec:
    jobCategories:
      - name: pt-training-category
        nodeSelector:
          ai-compute: "true"
          training: "true"
      - name: pt-prediction-category
        nodeSelector:
          ai-compute: "true"
          prediction: "true"
    containers:
      - image: sdartifact.td.teradata.com:7001/ai-runner/ai-runner-pytorch-v1:0.1.6-AII-2694-dev
        command: "python"
        args:
          - "/home/ai/main.py"
        workingDir: "/app/data"
        imagePullPolicy: "Always"
```

FIG. 6

MANAGEMENT OF DIVERSE DATA ANALYTICS FRAMEWORKS IN COMPUTING SYSTEMS

CROSS-REFERENCE TO RELATED PATENT APPLICATIONS

This patent application takes priority from the U.S. Provisional Patent Application No. 63/043,708, entitled: "Systems and Methods for Dynamic Management of Analytical Engines Utilizing Declarative APIs," by David Mueller, filed on Jun. 24, 2020, which is hereby incorporated herein by reference in its entirety and for all purposes.

BACKGROUND

In the context of computing environments and systems, data can encompass virtually all forms of information. Data can be stored in a computer readable medium (e.g., memory, hard disk). Data, and in particular, one or more instances of data can also be referred to as data object(s). As it is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the Relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

A more recent development in database systems is the use of multi-processing computing or parallel computing system, especially Massively Parallel Processing (MPP) database systems that use a relatively large number of processing units to process data in parallel.

Another more recent development is the development of modern Analytics (or Data Analytics or Data Analysis). As it is generally known in the art: "Data analytics (DA) is the process of examining data sets in order to find trends and draw conclusions about the information they contain. Increasingly data analytics is used with the aid of specialized systems and software. Data analytics technologies and techniques are widely used in commercial industries to enable organizations to make more-informed business decisions. It is also used scientists and researchers to verify or disprove scientific models, theories and hypotheses." (see, for example, "https://searchdatamanagement.techtarget.com/definition/data-analytics")

Also, "As a term, data analytics predominantly refers to an assortment of applications, from basic business intelligence (BI), reporting and online analytical processing (OLAP) to various forms of advanced analytics. In that sense, it's similar in nature to business analytics, another umbrella term for approaches to analyzing data. The difference is that the latter is oriented to business uses, while data analytics has a broader focus. The expansive view of the term isn't universal, though: In some cases, people use data analytics specifically to mean advanced analytics, treating BI as a separate category. Data analytics initiatives can help businesses increase revenues, improve operational efficiency, optimize marketing campaigns and customer service efforts. It can also be used to respond quickly to emerging market trends and gain a competitive edge over rivals. The ultimate goal of data analytics, however, is boosting business performance. Depending on the particular application, the data that's analyzed can consist of either historical records or new information that have been processed for real-time analytics. In addition, it can come from a mix of internal systems and external data sources." (see, for example, "https://searchdatamanagement.techtarget.com/definition/data-analytics")

More modern Data Analytics techniques can be quite complex, including, for example, statistical analytics, machine learning methods, discrete mathematics (e.g., graph analytics, deep learning). Today, various Data Analytics frameworks (or platforms) are available and this diversity is expected to continue to grow even more.

In view of the ever-increasing need for Data Analytics, improved techniques for performing Data Analytics in diverse environments, would be very useful.

SUMMARY

Broadly speaking, the invention relates to computing environments and systems. More particularly, the invention relates to improved techniques for managing diverse Data Analytics Frameworks.

Among other things, the improved techniques allow for Data Analytics Engines (or Engines) to be provided as a "black-boxed" abstraction to their "users" (or entities that use the engines to perform data analytics). Among other things, this allows a user to mix and match analytical components if their input data matches the input requirement of the engine. Furthermore, by decoupling the Data Analytics Engine creation from the environment, a high degree of process automation, scalability, and improved maintainability can be achieved. As a result, Data Analytic engineers and Data Scientists can create reusable components for other scientists and business users, whereas the users need not know how the Engines are coded or the environment in which their engines will run, but only need to know the input schema of the data. Infrastructure engineers can impose constraints and scale the workloads based on the available resources. This can also facilitate governance and auditability and consequently address the needs of analytics practitioners in a connected engine ecosystem.

In accordance of other aspect, Declarative API's, and Dynamic Engine Management can be provided in addition an Engine Abstraction. The Dynamic Engine Management, among other things, allows generation of Data Analytic Engines for specific platforms as needed, as well updating and removal of them. The Dynamic Engine Management can also include management (or orchestration) of operations of the Data Analytics Engines.

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4 depicts a "JobClass" resource definition of a Machine Learning training job for a Keras Model running on a "TensorFlow 2" Engine in accordance with one exemplary embodiment.

FIG. 5 depicts the "ArtifactClass" resource definition of the input referenced in a "JobClass" (shown in FIG. 4) in accordance with one exemplary embodiment.

FIG. 6 depicts a "Runner" resource definition of a "PyTorch" Runner in accordance with one exemplary embodiment.

DETAILED DESCRIPTION

As noted in the background section, improved techniques for performing Data Analytics, especially in a diverse environment, would be very useful.

To elaborate further, today, modern analytical solutions to business problems in an enterprise system make increasing use of a diverse range of tools (e.g., proprietary tools, open-source tools) to, for example, iteratively create value from the enterprise datasets and to manage the entire solution lifecycle from inception to production. In doing so, Data Scientists, Analysts, and Business Process Owners would like to collaborate on complex analytical value chains that span across analytical frameworks and that are often required to run on shared computing (or compute) infrastructure. In addition, Today's analytical tool landscape is rapidly changing and evolving, and so are the needs of its users. For example, constantly growing data volume and velocity and increasing depth of analytical modeling approaches (e.g., Deep Learning) mandate a highly Scalable and Elastic approach to compute distribution and orchestration. As such, managing analytical frameworks in the context of an analytical platform on a shared infrastructure is highly desirable and would be very beneficial.

Figure 1:
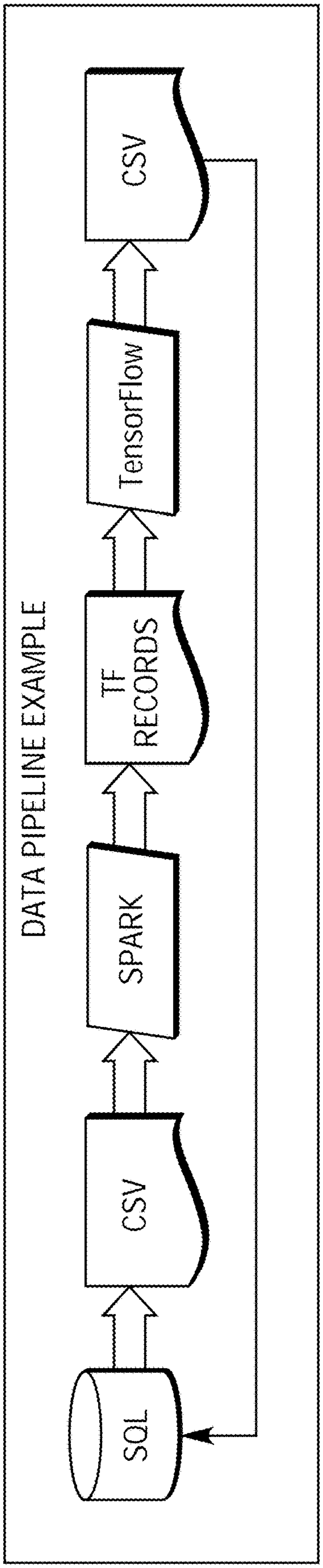
FIG. 1 depicts multiple Data Analytics platforms (or frameworks) in one exemplary desired configuration in accordance with one embodiment.

To elaborate even further, FIG. 1 depicts multiple Data Analytics platforms (or frameworks) in one exemplary desired configuration in accordance with one embodiment. Referring to FIG. 1, a "Spark" Data Analytics platform (or framework) and a "TensorFlow" Data Analytics platforms (or framework) are shown. For example, the "Spark" Data Analytics framework can represent an "Apache Spark" as an Open-Source Distributed General-Purpose Cluster-Computing Framework, as it is generally known in the art. It should be noted that "Spark" Data Analytics framework can access data formatted as "CSV" (or ".CSV"). "CSV" data can, for example, represent comma-separated values file, that allows data to be saved in a tabular format (e.g., CSV data that looks like a garden-variety spreadsheet but with a. csv extension-CSV files that can be used with most any spreadsheet program, such as Microsoft Excel or Google Spreadsheets).

In the example shown in FIG. 1, it the "Spark" Data Analytics framework produces data (or results) as "TF records" of another Data Analytics framework, namely, "TensorFlow" Data Analytics platform that can, for example, be provided as a free and Open-Source software library for Machine Learning. This software library can be used across a range of tasks but can also have a particular focus on training and inference of deep neural networks, as generally known in the art. It should also be noted that a SQL Database can also exist with the "Spark" and "TensorFlow" Data Analytics Frameworks. More Particularly, it would be desirable to allow that "Spark" and "TensorFlow" Data Analytics Frameworks to work together to allow a data pipeline (or data exchange) across these diverse Data Analytics frameworks and the SQL database.

To at least partly address the need for managing analytical frameworks in the context of an analytical platform on a shared infrastructure, improved techniques for managing diverse Data Analytics (or Analytical) platforms are disclosed.

In one aspect, the improved techniques allow for Data Analytics Engines (or Engines) to be provided as a "black-boxed" abstraction to their "users" (or entities that use the engines to perform data analytics). Among other things, this allows a user to mix and match analytical components if their input data matches the input requirement of the engine. Furthermore, by decoupling the Data Analytics Engine creation from the environment, a high degree of process automation, scalability, and improved maintainability can be achieved. As a result, Data Analytic engineers and Data Scientists can create reusable components for other scientists and business users, whereas the users need not know how the Engines are coded or the environment in which their engines will run, but only need to know the input schema of the data. Infrastructure engineers can impose constraints and scale the workloads based on the available resources. This can also facilitate governance and auditability and consequently address the needs of analytics practitioners in a connected engine ecosystem.

In accordance of other aspects, Declarative API's, and Dynamic Engine Management can be provided in addition an Engine Abstraction. The Dynamic Engine Management, among other things, allows generation of Data Analytic Engines for specific platforms as needed, as well updating and removal of them. The Dynamic Engine Management can also include management (or orchestration) of operations of the Data Analytics Engines.

Embodiments of aspects of the improved techniques are also discussed below with reference to FIGS. 2-9. However, those skilled in the art will readily appreciate that the detailed description given herein with respect to these figures is for explanatory purposes as the invention extends beyond these limited embodiments.

Figure 2:
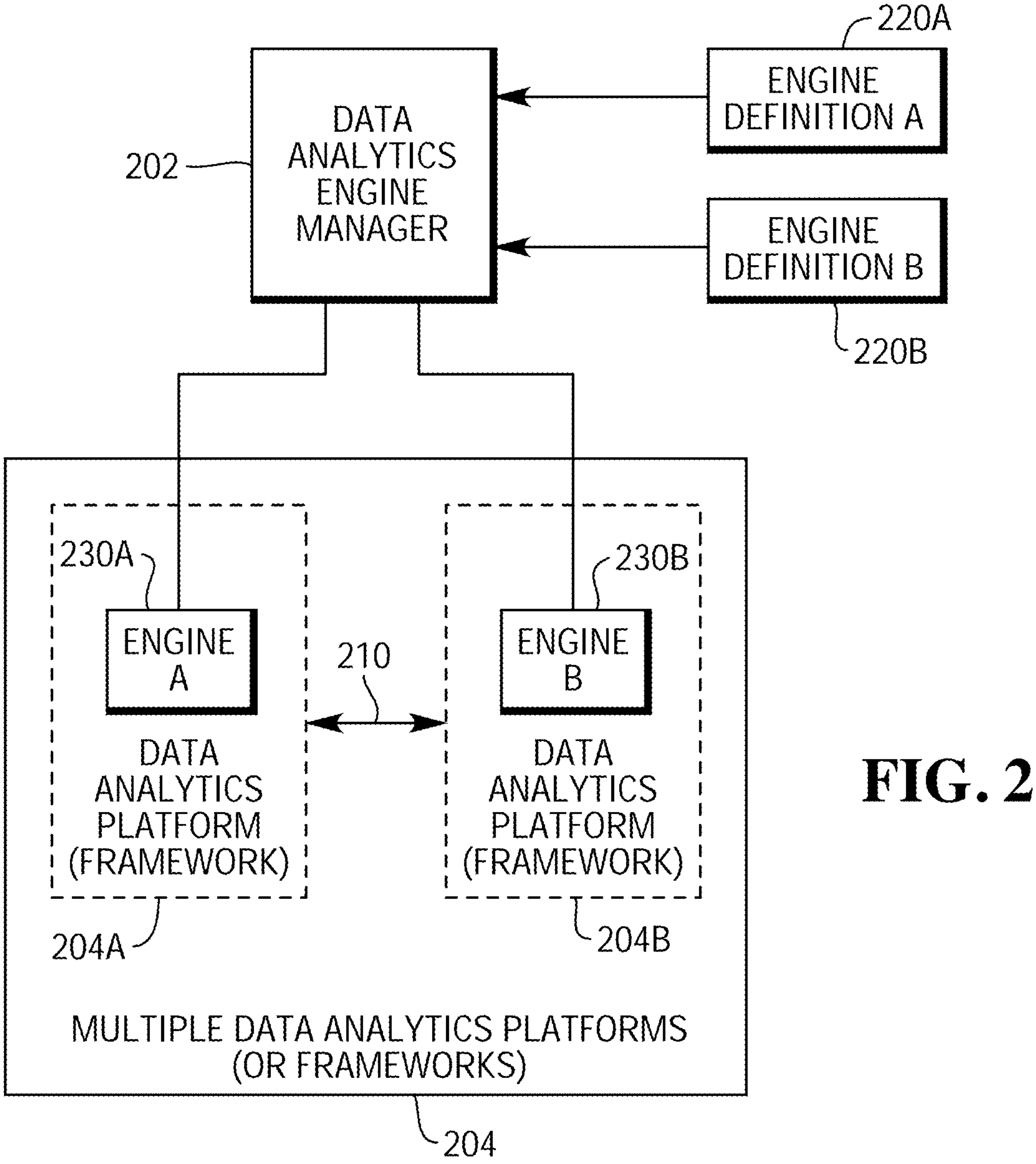
FIG. 2 depicts a Data Analytics Engine Manager configured to operate as a Unifying Data Analytics Frameworks (or Platform) to unify Multiple diverse Data Analytics Platforms (or Frameworks) in a computing environment, in accordance with one embodiment

FIG. 2 depicts a (Unifying) Data Analytics Engine Manager 202 configured to operate as a Unifying Data Analytics Framework (or Platform) to effectively unifying Multiple diverse Data Analytics Platforms (or Frameworks) 204 in a computing environment 200, in accordance with one embodiment. "Data Analytics Engine(s)" are also referred to herein a "Engine(s)" for brevity. Although Data Analytics Engine Manager is depicted as being outside the Multiple diverse Data Analytics Platforms 204, it will be appreciated that at least partly, if not entirely, the Multiple diverse Data Analytics Platforms (or Frameworks) 204 can be provided inside the Multiple diverse Data Analytics Platforms 204 as will be appreciated and discussed in greater detail below. In other words, the Data Analytics Engine Manager 202 can be and/or can provide one or more "pluggable" components (e.g., Data Analytics Engine A 203A, Data Analytics Engine B 203). As such, the Unifying Data Analytics Framework (or Platform) can be a "Pluggable" Unifying (or signal) Framework that be used to provide multiple "pluggable" engines for (and/or on) Multiple diverse Data Analytics Platforms (or Frameworks) 204 in a computing environment 200. The Data Analytics Engine Manager 202 can, for example, be provided as hardware, software, or a combination thereof, as it will readily be appreciated by those skilled in the art. As such, the Data Analytics Engine Manager 202 can, for example, be provided in or as a computing device that includes one or more processors configured to access memory and execute computer program code stored in the memory.

Referring to FIG. 2, Multiple Data Analytics Platforms 204 include a first Data Analytics Platform 204A and second Data Analytics Platform 204B. It should be noted that the first Data Analytics Platform 204A and second Data Analytics Platform 204 can vary from each other with respect to at least one criterion. As such, the first and second Data Analytics Platform 204A and 204B can, for example, vary with respect to whether they are Open Source or Proprietary, how data is organized and/or is formatted by them respectively, etc. Generally, first and second Data Analytics Platform 204A and 204B would require different data engines to perform data analytics on their data or respective databases. For example, the first Data Analytics Platform 204A can be a "Spark" data analytics platform or framework and the second Data Analytics Platform 204B can be a "TensorFlow" data analytics platform or framework as describe above with respect to FIG. 1. Of course, although not shown in FIG. 2 for simplicity, additional data analytics platforms can exist and interface with each other, including, for example, a SQL database platform that can receive database query of a SQL database. It should be noted that it is desirable to allow data to be interchanged between the first and second Data Analytics Platforms 204A and 204B effectively interact via a data pipeline 210.

Referring again to FIG. 2, the Data Analytics Engine Manager 202 can obtain multiple definitions of Data Analytics Engines namely, a first Data Analytics Engine Definition (DAED) 220A and a second Data Analytics Engine Definition (DAED) 220B. It should be noted that the first Data Analytics Engine Definition (DAED) 220A is a definition of an Analytics Engine designated to perform Data Analytics on the first Data Analytics Platform 204A. However, the second Data Analytics Engine Definition (DAED) 220B is a definition of an analytics engine designated to perform data analytics on the second Data Analytics Platform 204B. By way of example, the first Data Analytics Engine Definition (DAED) 220A and a second Data Analytics Engine Definition (DAED) 220B can be provided effectively as or via a set of Application Programming Interfaces (APIs'). In other words, Data Analytics Engine Definitions (DAED's) 220A and 202 can be definitions made by using set of Application Programming Interfaces (APIs'), as it will be discussed in greater detail below.

Figure 3:
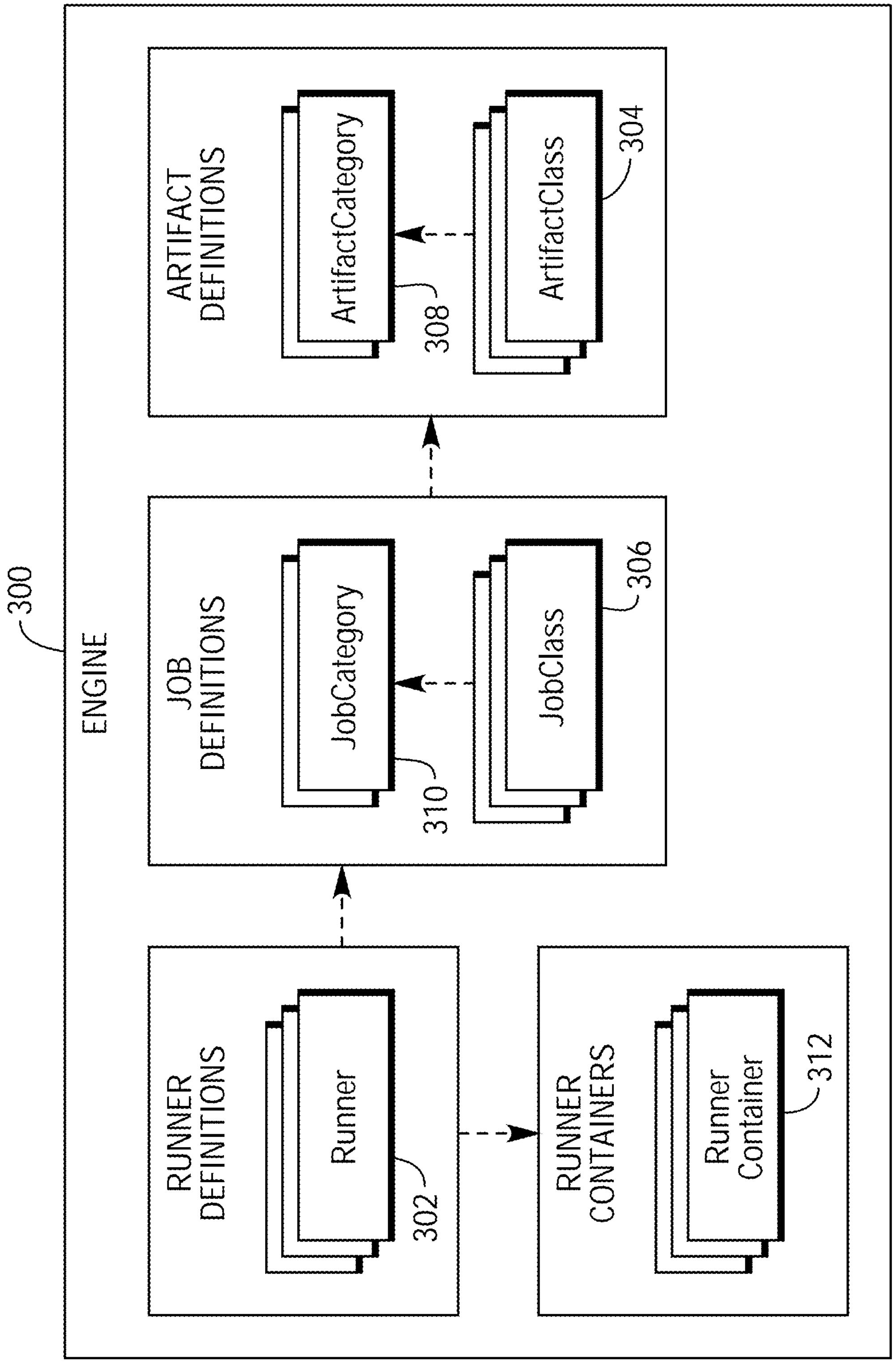
FIG. 3 depicts a Data Analytics Engine in accordance with one embodiment.

As it will also be discussed in greater detail below, based on the obtained Data Analytics Engine Definitions (DAED's) 220A, the Data Analytics Engine Manager 202 can generate a first Data Analytics Engine 230A capable of performing Data Analytics (operations) for (and/or on and/or in) on the first Data Analytics Platform 204A. It will be appreciated that the Data Analytics Engine Manager 202 can generate a first Data Analytics Engine 230A while it still operating in the on the Multiple Data Analytics Platforms (or framework) 204 and/or one or more other Data Analytics Engines are still operating in a computing environment 200. As such, the Data Analytics Engine Manager 202 can obtain (e.g., receive, determine, identify) additional Data Analytics Engine Definitions (not shown) while operating on the Multiple Data Analytics Platforms 204 to generate another Data Analytics Engine without having to stop or interrupt the operation of the first Data Analytics Engine 230A. In other words, while the generated the Data Analytics Engine 230A is (still) operating on the Multiple Data Analytics Platforms 204, the Data Analytics Engine Manager 202, can generate, another Data Analytics Engine, namely, a second Data Analytics Engine 230B, that is generated based on the second obtained Data Analytics Engine Definitions 220B. Furthermore, the Data Analytics Engine Manager 202 can remove a generated Data Analytics Engine 230A and/or 230B, generate an updated Data Analytics Engine for Data Analytics Engine 230A and/or 230B as needed in a dynamic manner, as it will also be discussed in greater detail below. In other words, Data Analytics Engine Manager 202 can effectively manage the Data Analytics Engines for the Multiple Data Analytics Platforms 204 in a dynamic manner, by generating, removing, updating, etc. the engines as needed. It will also be appreciated that the Data Analytics Engine Manager 202 can also effectively manage the operations of the Data Analytics Engine 230A and/or 230B, as it will also be discussed in greater detail below. Data Analytics Engine Manager 202 can also manage the activities of Data Analytics Engines 204 and 204 B and effectively orchestrate them to effectively establish and maintain the data pipeline 210, as will also be discussed in greater detail below. Although not shown in FIG. 2, it should also be noted that multiple Engines, or different version of an Engine can be operating at the same time in or for a single Data Analytics Platform (e.g., 204A, 204B). For e To elaborate further, FIG. 3 depicts a Data Analytics Engine 300 in accordance with one embodiment. The Data Analytics Engine Manager 300 can, for example, represent in greater detail components of a data engine (e.g., 230A, 230B) that can be provided (or generated) by the Data Analytics Engine Manager 202 (shown in FIG. 2).

Referring to FIG. 3, a Runner resource component 302 can be provided as an abstraction of an execution unit of an engine, for example, as a smallest and/or simplest unit that an Analytic Framework (or Platform) can deploy. The Runner resource component 302 can effectively define a Data Analytic environment, including, for example, one or more Jobs that it supports, the requirements for deploying it in a cluster (e.g., container image, node affinities, readiness probe, liveness probe, environment variables, communication ports and, protocol), and one or more user-configurable properties that affect the runtime environment. For example, a Graphical Processors Unit (GPU) "Runner" could declare that it supports machine learning jobs, requires a specific Docker image, and has a property for the user to indicate how many GPUs to use. In contrast, a Central Processing Unit (CPU) "Runner" could declare that it supports the same machine learning jobs, but it may use a different "Docker" image and not define any user-configurable properties, as it will be appreciated by those skilled in the art.

Referring again to FIG. 3, the input parameters to a Job and the output metadata can be defined by "ArtifactClasses" 304 such that, for example, each "ArtifactClass" 304 can include a description of the properties it supports and the associated validation requirements. In one exemplary embodiment, A user may only be allowed to create an artifact, or an instance of an "ArtifactClass" 304, if the artifact passes the validation requirements. In addition, a "JobClass" resource 306 can be provided as an abstraction of a Job that defines its input, output, and execution. The input can refer to an "ArtifactClass" 304 that provides its input parameters and references to stored data that will be made available to the Runner 302. The output can refer to an "ArtifactClass" 304 that is used to construct an artifact from the output of the Runner. Every JobClass must define one or more Runners that can be used to execute the Job. It may also specify additional properties for each "Runner" 302 that defines how the Job should be executed. A typical example is having separate "Runners" 302 for performing work on CPUs or GPUs. A "JobClass" 306 may also indicate it is preemptable meaning that it can be paused and later resumed from where it was stopped. This allows for freeing up resources needed by higher-priority Jobs, and (resuming the job (or work) when the resources are available again. An "ArtifactCategory" 308 and "JobCategory" 310 can be used to group similar "ArtifactClasses" 304 and "JobClasses" 306, respectively. One typical usage is in defining a "Job-Category" 310 to group all "JobClasses" 306 that perform the Machine Learning training tasks and to define an "Arti-factCategory" 308 to group all "ArtifactClasses" 304 for different types of input datasets for those training tasks. It should be noted that "Runner Containers" 312 can also be provided for the "Runner" 302, for example, as thin Virtual Machines to allow or support the execution (or running) of the "Runner" 302.

As noted above, a Data Analytics Engine can be provided as an abstraction in accordance with one aspect. In order words, to effectively "run" (or execute) a particular Data Analytic Engine on top of a specific Data Analytic platform, the engine structure (or internal) can be abstracted. This abstraction can be effectively represented by (or grouped into) four (4) conceptual parts (or groups), namely: (i) Job Definitions, (ii) Artifact Definitions, (iii) Runner Definitions, and (iv) Runner Containers. A Data Analytics Engine defined and packaged this way can provide virtually all necessary information for deploying against a Pluggable Engine Platform in accordance with one or more aspects. When deployed, the Platform can create and orchestrate one or more jobs defined within the engine in accordance with one or more aspects.

Declarative API

The idea of a Declarative API can relate to the ability to define the 4 components noted above, namely: (i) Job Definitions, (ii) Artifact Definitions, (iii) Runner Definitions, and (iv) Runner Containers in accordance with one embodiment. For example, declarative APIs can be provided using YAML (YAML Ain't Markup Language) documents that are easy to understand and human-readable. As it is generally known in the art, YAML is commonly used for configuration files and in applications where data is being stored or transmitted. YAML can target many of the same communications applications as Extensible Markup Language (XML) but has a minimal syntax. A YAML document can begin with a standard header that defines the type of resource and some basic metadata. This information can then be used by a Data Analytic Platform to route the resource to the correct API. It also can define a specification that details the contents of the resource. A standard header can, for example, include: (i) apiVersion: a URI that indicates the Analytic Platform API and the version, (ii) metadata: defines the name and human-readable attributes: (a) name: a unique system name used to reference the resource, (b) alias: a short and user-friendly name, (c) description: describes the purpose of the resource, (d) version: indicates a specific state or release of the document, and (e) labels: a map for additional attributes, (iii) kind: describes the resource defined in the file; exemplary values are: (a) "ArtifactCategory," (b) "ArtifactClass," (c) "JobCategory," (d) "JobClass," and (e) Runner, and (iv) spec: details the contents of the resource defined by what kind it is.

Some resources can provide properties for validating user-supplied values. These properties can, for example, be defined using a JSON (JavaScript Object Notation) schema allowing for a rich data structure composed of objects and metadata as will be appreciated by those skilled in the art. As generally known in the art, JSON is an Open Standard file format, and data interchange format, that uses human-readable text to store and transmit data objects consisting of attribute-value pairs and array data types. It is a very common data format, with a diverse range of applications, such as serving as a replacement for XML in AJAX. In doing so, each property can indicate the types of values allowed and may also indicate a default value, validation requirements, such as a minimum or maximum value, or a description of the property. The types of values supported can include numbers and strings, as well as more complex types such as objects. Additional types specific to the framework have been added in accordance with one embodiment. The additional types specific to the framework include: (i) "artifactReference": references an artifact, and "storageReference": references a storage such as a file.

To elaborate even further, FIG. 4 depicts a "JobClass" resource definition of a Machine Learning training job for a Keras Model running on a "TensorFlow 2" Engine in accordance with one exemplary embodiment.

FIG. 5 depicts the "ArtifactClass" resource definition of the input referenced in a "JobClass" (shown in FIG. 4) in accordance with one exemplary embodiment.

FIG. 6 depicts a "Runner" resource definition of a "PyTorch" Runner in accordance with one exemplary embodiment. As generally known, "PyTorch" is an Open-Source Machine Learning library based on the "Torch" library, used for applications such as computer vision and natural language processing, primarily developed by Facebook's AI Research lab. It is free and open-source software.

Engine Framework

Overview

As noted above, a Data Analytics Engine can be provided as an abstraction in accordance with one aspect. In order words, to effectively "run" (or execute) a particular Data Analytic Engine on top of a specific Data Analytic platform, the engine structure (or internal) can be abstracted. This abstraction can be effectively represented by (or grouped into) four (4) conceptual parts (or groups), namely: (i) Job Definitions, (ii) Artifact Definitions, (iii) Runner Definitions, and (iv) Runner Containers.

While Runner containers can be managed by an external container registry, the framework can provide at least four (4) core services for dynamic registration of an engine and its associated definitions. The first service, can be referred to as an "Engine-Specific Manager" that is responsible for dynamic registration of a Data Analytics Engine as a single unit and delegating registration of associated resources to the other services. The other services can manage the definitions that are defined by an engine and can be referred to as: "Runner" Manager: manages "Runner" definitions, "Artifact" Manager: managers Artifact definitions including "ArtifactCategories" and "ArtifactClasses", and "Job" Manager: manages Job definitions including "JobCategories" and "JobClasses."

The four (4) core services noted above can effectively provide a Pluggable Engine Framework. To elaborate even further, FIG. 7 depicts how the Pluggable Engine Framework and related engines can integrate into a relatively larger Analytic Platform Environment in accordance with one embodiment.

Figure 7:
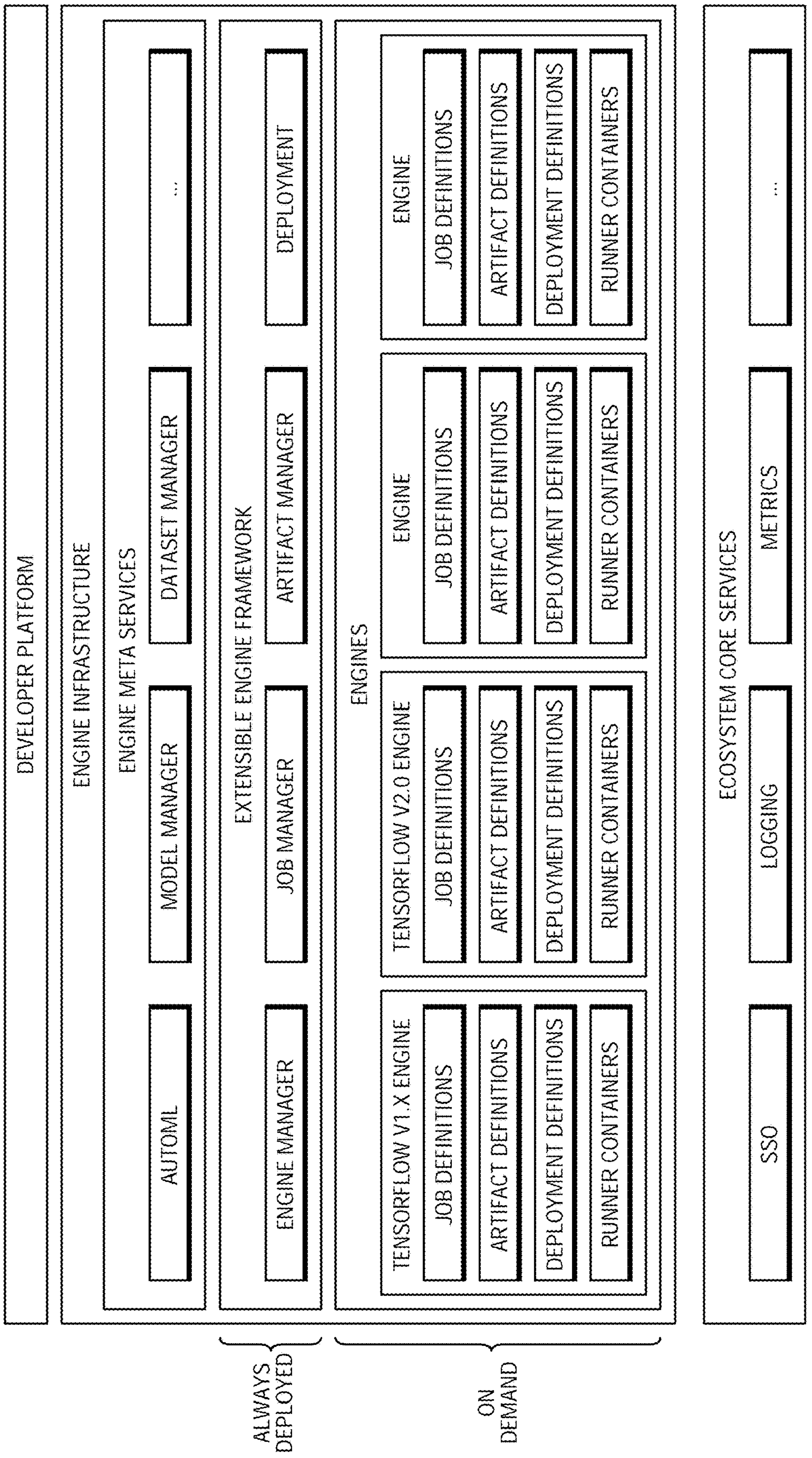
FIG. 7 depicts how the Pluggable Engine Framework and related engines can integrate into a relatively larger Analytic Platform Environment in accordance with one embodiment.

As shown in FIG. 7, a Pluggable Engine Framework and its engines can leverage core services from the Analytic Platform (logging, SSO, etc.) and can be consumed by higher-level services, or Meta-Services, to achieve more complex tasks.

Services Roles and Responsibilities

A Runner Manager can be responsible for Dynamic registration and un-registration of new "Runner" Definitions, and Management of "Runner" execution. As will be appreciated by those skilled in the art, Dynamic management of "Runner" Definitions can, for example, be provided as a set of "RESTful" APIs: (i) Create (or register) a "Runner" Definition, (ii) "Read" and "List" existing "Runner" Definitions, (iii) Delete (or unregister) a "Runner" Definition. Dynamic management of "Runners" can also be provided as a set of RESTful APIs: (i) "Create" a "Runner" execution instance, (ii) "List" a "Runner" execution instance, "Update" (or control), the execution of a "Runner" execution instance (e.g., start, stop) and "Delete" a "Runner" execution instance.

A "Runner Manager" can also consider "Runner Definitions" and instances as a black-box and therefore does not need to be coupled to any details about the job-specific implementation. Only the parameters declared at registration time need be known to the Runner Manager.

Artifact Manager

An "Artifact Manager" can have at least two (2) main responsibilities: (i) Dynamic registration and un-registration of new Artifact Classes, and (ii) Management of Artifact instances. Dynamic registration of "Artifact Classes" can, for example, be provided as a set of RESTful APIs: (i) "Create" (or register) a new "ArtifactClass", submitted as a YAML document (ii) Read and List existing "ArtifactClasses," and "Delete" (or unregister) an "ArtifactClass."

"Artifact" instances can be managed after an "ArtifactClas" is registered. Another set of RESTful APIs can provide "CRUD" capabilities for Artifact instances. When creating a new "Artifact" instance from an "ArtifactClass," an "Artifact Manager" can be responsible for verifying that the given "Artifact" complies with the schema defined in the corresponding "ArtifactClass." For example, the "Artifact Manager" can return a "UUID" pointing to the new instance if the object complies. Otherwise, the instance is rejected and the "Artifact Manager" can return an error code along with one or more reasons for the rejection. An "Artifact Manager" need not need to understand the actual content of the "Artifact instances" as it can consider it to be a "black-box."

Job Manager

A "Job Manager" can be least responsible for Dynamic Registration and Un-Registration of new "Job Classes," and Management of "job" instances. Similar to a "Artifact Manager", in one embodiment, a "Job Manager" can, for example, provide a set of RESTful APIs to at least: Create (or Register) a new "JobClass", submitted as a YAML document, Read and List existing "JobClasses, and Delete (or Unregister) a "JobClass," as it will be appreciated by those skilled in the art.

Similarly, "Job" instances can be managed after a "JobClass" is registered. A Job instance can encapsulate at least: (i) Input: an instance of an Artifact containing the appropriate input parameters for a job, (ii) Output: the expected output of a Job which becomes an Artifact once the job completes execution, and (ii) "Runners": defines which Runners can be used to execute the job and values for the Runner's properties. Managing "job instances" can, for example, be done through the following set of RESTful APIs offering CRUD capabilities: (i) "Create a Job": defines all the inputs and Runner parameters for a Job, and returns a UUID, (ii) "Read and List": returns the current state for a Job, which can be one of: Created, Submitted, Running, Completed, Published, and Deleted, and (iii) "Update": triggers a change of state such as "start" or "publish", and (iv) "Delete": releases underlying compute resources and changes the state to "Deleted" which prevents any further change of state.

The result of a Job can only be available as an Artifact after the Job is published in accordance with one embodiment. Having a dedicated publish phase in a lifecycle of a Job allows for both manual and automatic publication, offering more flexibility and control for the consumer of this service.

As mentioned above, a "JobClass" can declare, during the registration process, if it supports preemption. When enabled, a Job Manager can allow at least two more triggers: pause, and resume. When paused, the running job is given a grace period to persist in a critical state. When resumed, the job can recover its state previously persisted, hence minimizing the amount of lost computation. It can be up to a "Runner" to implement a strategy for handling interruptions such as checkpointing intermediate results to disk.

Engine Manager

The three (3) services describe so above, namely, "Runner Manager," "Artifact Manager," and "Job Manager", can provide an endpoint to dynamically register new resources. However, an "Engine" can be the aggregation of many "Runner containers", "Runner Definitions," "Artifact," and "Job Classes." In other words, a "Engine Manager" can be responsible to ensure all the resources are successfully registered together, ensuring consistency at the engine level.

To that end, an "Engine Manager" can provide at least a set of RESTful APIs to: Create (or Register) an engine, Read and List already registered engines, and Delete (or unregister) an engine. It is worth noting that the "Engine Manager" does not need to register resources by itself but it can delegate the resource registration to the proper service based on the type of resource.

To achieve engine-level consistency, the registration of an Engine can be considered successful only if all the resources it is responsible for are properly registered. Failure to register one resource can mark the entire Engine installation as "Failed". Similarly, Deleting an Engine can require Deletion of all of its corresponding resources.

Dynamic Engine Management

Overview

Conceptually, Dynamic Engine Management can be the ability to register or unregister a new Engine within the Analytic Platform without any downtime. This can be a critical feature for Machine Learning platforms where long-running jobs are typical and interrupting these jobs would have a large diverse impact on the business. As such, registering a new engine can be achieved without having to adversely impact existing engines already installed and perhaps even more importantly without having to impact existing running jobs. To illustrate this point, let's consider a scenario where ten (10) trainings jobs of five (5) day duration each already for two (2) days. Stopping all of these jobs to install a new analytics Engine would mean losing about twenty 20 days of computation. However, waiting for the jobs to complete before installing the new Engine would effectively delay the value of having the new engine by three (3) days.

Registration Description

Figure 8:
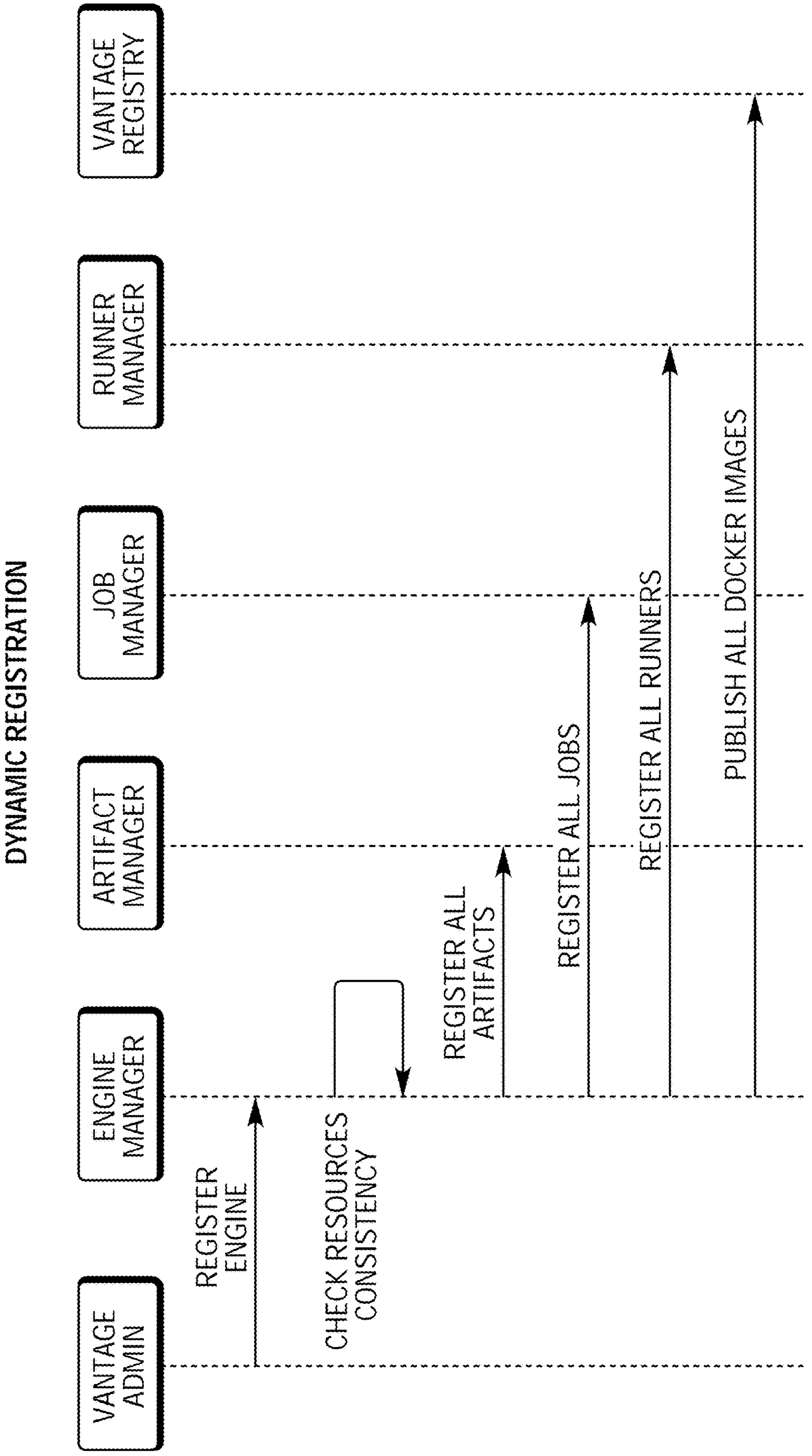
FIG. 8 depicts a Dynamic registration Process in accordance with one embodiment

During the Registration of an Engine all engine resources can be registered on an Analytic Platform. After the registration process, the user can create, read, and delete any instance of these resources. In addition, the schema of each resource and the consistency between resources can be checked by the Analytic Platform. The dynamic registration process can be an "atomic" one where the Engine is Registered if and only if all Engine resources are correct and consistent. The Registration will fail if this condition is not met. This can ensure the consistency of the Analytic Platform. A consistency check can be done before the actual Registration of resources. This could also include that deployment definitions are containing resource utilization limits. FIG. 8 depicts a Dynamic registration Process in accordance with one embodiment.

Un-Registration Description

The mechanism to unregister an engine from the Analytic Platform can be similar to the registration mechanism as noted above, as those skilled in the art will readily appreciate. An "Un-Registration" operation can delete all previously registered resources in accordance with one embodiment. After this operation, the user is no longer able to create any new resources for that engine unless it is reinstalled.

Figure 9:
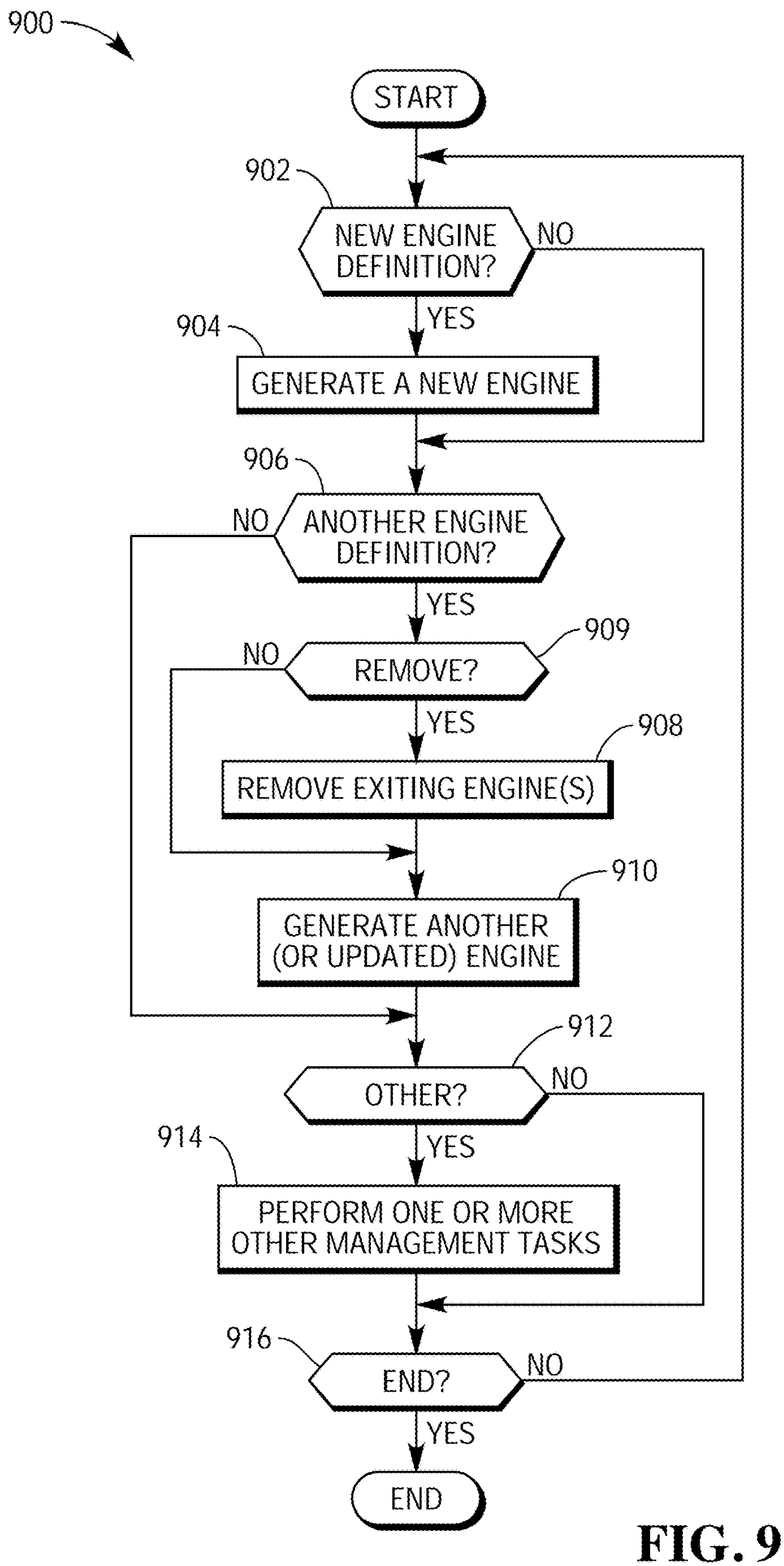
FIG. 9 depicts a method 900 for managing a data analytics computing environment that includes multiple data analytics platforms in accordance with one embodiment

To elaborate even further, FIG. 9 depicts a Method 900 for managing a Data Analytics Computing Environment that includes multiple Data Analytics Platforms (or Frameworks) in accordance with one embodiment. It should be noted that the multiple Data Analytics Platforms include a first Data Analytics platform and a second Data Analytics platform that differ from each other with respect to at least one criterion. Method 900 can, for example, be performed by Data Analytics Engine Manager 202 to effectively provide a unifying framework to unify multiple diverse Data Analytics Platforms by providing multiple Data Analytics Engines that can, for example, be plugged in the multiple diverse Data Analytics (shown in FIG. 2).

Referring to FIG. 9, Method 900 can effectively initiate management of multiple Data Analytics Platforms by determining (902) whether a definition of a new Data Analytics Engine has been received for a particular Data Analytics Platform and generate (904) the new Data Analytics Engine in a corresponding first Data Analytics platform of the multiple Data Analytics Platforms accordingly. It should be noted that the new Data Analytics Engine can be generated (904) while one or more other Data Analytics Engines are (still) operating and without interfering with the operations of the existing as Data Analytics Engine(s). as discussed in greater detail above. As noted above, multiple Engines can also operate in the same Data Analytics platform (e.g., first Data Analytics platform) at the same time.

However, if it is determined (902) that a definition of a new Data Analytics Engine has not been received, Method 900 can proceed to determine (906) whether another definition of a Data Analytics Engine (e.g., updated definition of an existing Data Analytics Engine) has been received for a Data Analytics platform with one or more other existing engines operating in or for the platform, Accordingly, if it is determined (906) that another definition of a Data Analytics Engine has been received, it can be determined (909) whether to remove one or more existing corresponding Data Analytics Engines. Accordingly, one or more existing corresponding Data Analytics Engines can be removed (908) in the corresponding Data Analytics Platform and another (e.g., updated version) of the Data Analytics Engine can be generated (910) to effectively replace the older version of the Data Analytics Engine. However, if it is determined (909) not to remove any existing engines, another Data Analytics Engine can be generated (910) to have more than one operating at the same time on the same Data Analytics Platform.

It should also be noted that the removing (908) and generating (910) operations can also be performed while one or more other Data Analytics Engines are (still) operating in one or more other Data Analytics Platforms and without interfering with their operations as discussed in greater detail above. Similarly, it can be determined (912) whether to perform other management operations related to the multiple Data Analytics Platforms (e.g., one or more operations pertaining to management of an existing Data Analytics Engine). Accordingly, one or more other management operations (or tasks) can be performed (914). Method 900 can proceed to operate as a similar manner as discussed above until it is determined (916) to end it, for example, as a result of system shutdown.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of managing a data analytics environment that includes multiple data analytics platforms, wherein the multiple data analytics platforms include a first data analytics platform and a second data analytics platform that differ from each other with respect to at least one criterion, wherein the computer-implemented method is performed at least partly by a computing system that includes one or more processors configured to execute computer executable code, and wherein the computer-implemented method comprises:

providing, by the computing system, a data analytics engine manager managing data analytics of the first data analytics platform and a second data analytics platform;

obtaining, by the data analytics engine manager of the computing system, a first data analytics engine definition that includes one or more Application Program Interfaces that define a first data analytics engine designated to perform data analytics on the first data analytics platform of the multiple data analytics platforms, wherein the one or more Application Program Interfaces include one or more declarative application program interfaces each defining multiple resources, wherein the multiple defined resources include: (i) one or more job definitions defining one or more executable jobs that are supported by the first data analytics engine, (ii) one or more artifact definitions including a description of the properties supported by the first data analytics engine and one or more associated validation requirements of the first data analytics engine, (iii) one or more runner definitions executing the job definitions supported by the first data analytics engine, and (iv) one or more runner containers supporting the execution of the job definitions by the one or more runner definitions;

generating, by the data analytics engine manager of the computing system, based on the obtained first definition engine, a version of the first data analytics engine for the first data analytics platform as a first pluggable engine, wherein the generating of the version of the first data analytics engine for the first data analytics platform further comprises: generating the first pluggable engine, at least in part, based on an abstraction represented at least by the following: (a) the one or more runner definitions of the first pluggable engine, (b) the one or more runner containers of the first pluggable engine, (c) the one or more job definitions of the first pluggable engine, (d) the one or more artifact definitions provided for the first pluggable engine;

wherein the first data analytics engine includes at least one runner resource manager and at least one runner resource component, wherein the at least one runner resource component is provided as an abstraction of an execution unit of the first data analytics engine of the first pluggable engine and further defines a data analytics environment, including one or more jobs that the data analytics environment supports, and wherein the at least one runner resource manager at least: (i) dynamically registers and unregisters at least one other runner definition, and (ii) manages execution of the one or more runner definitions and the at least one other runner definition;

plugging, by the data analytics engine manager, the generated first pluggable data analytics engine into the first data analytics platform; and thereafter performing, by the generated first pluggable data analytics engine, one or more data analytics operations.

2. The computer-implemented method of claim 1, wherein the generating of the version of the first data analytics engine of the first data analytics platform based on the obtained first definition engine further comprises:

generating the first data analytics engine as a pluggable engine while at least another data engine is operating in the second data analytics platform in the multiple data analytics platforms.

3. The computer-implemented method of claim 2, wherein the computer-implemented method further comprises:

obtaining a second data analytics engine definition that is a definition of a second data analytics engine designated to perform data analytics on the second data analytics platform of the multiple data analytics platforms; and generating, based on the obtained second definition engine, a version of the second data analytics engine for the second data analytics platform.

4. The computer-implemented method of claim 3, wherein the generating of the version of the second data analytics engine of the second data analytics platform based on the obtained second definition engine, generates the version of the second data analytics engine while the first data analytics engine is operating on the first data analytics platform of the multiple data analytics platforms.

5. The computer-implemented method of claim 4, wherein the version of the second data analytics engine and the version of the first data analytics engine interchange data between each other.

6. The computer-implemented method of claim 1, wherein the first data analytics engine definition is an updated data analytics engine, and wherein the generating of the version of the first data analytics engine provided for the first data analytics platform based on the obtained first definition engine further comprises:

determining whether to remove an older version of a data analytics engine provided for the first data analytics platform; and removing an older version of a data analytics engine of the first data analytics platform when the determining determines to remove the older version of a data analytics engine provided for the first data analytics platform; and generating the first data analytics engine as an updated version of the older version of the data analytics engine for the first data analytics platform.

7. The computer-implemented method of claim 6, wherein the generating the first data analytics engine as an updated version of the older version of the data analytics engine for the first data analytics platform comprises:

generating the first data analytics engine as an updated version while at least another data engine is operating in the second data analytics platform of the multiple data analytics platforms.

8. A computing system that includes one or more processors providing a Data Analytics Engine Manager that manages data analytics of the first data analytics platform and a second data analytics platform, wherein the Data Analytics Engine Manager:

operates on multiple data analytics platforms that vary from each other with respect to at least one criterion wherein the multiple data analytics platforms include a first data analytics platform and a second data analytics platform;

obtains multiple engine definitions of multiple data analytics engines, including a first obtained data analytics engine definition and a second obtained analytics engine definition, wherein the first data analytics engine definition includes one or more Application Program Interfaces that define a first data analytics engine designated to perform data analytics on the first data analytics platform, wherein the one or more Application Program Interfaces include one or more declarative application program interfaces each defining multiple resources, wherein the multiple defined resources include: (i) one or more job definitions defining one or more executable jobs that are supported by the first data analytics engine, (ii) one or more artifact definitions including a description of the properties supported by the first data analytics engine and one or more associated validation requirements of the first data analytics engine, (iii) one or more runner definitions executing the job definitions supported by the first data analytics engine, and (iv) one or more runner containers supporting the execution of the job definitions by the one or more runner definitions, and wherein the second data analytics data definition is a definition of a second data analytics engine designated to perform data analytics on the second data analytics platform;

generates, based on the obtained first data analytics engine, a version of the first data analytics engine for the first data analytics platform as a first pluggable engine, wherein the generating of the version of the first data analytics engine for the first data analytics platform further comprises: generating the version of the first data analytics engine, at least in part, based on the following: (a) one or more runner definitions, (b) one or more runner containers, (c) one or more job definitions, and (d) one or more artifact definitions, wherein the first data analytics engine includes at least one runner resource manager and at least one runner resource component, wherein the at least one runner resource component is provided as an abstraction of an execution unit of the first data analytics engine of the first pluggable engine and further defines a data analytic environment, including one or more jobs that the data analytics environment supports, and wherein the at least one runner resource manager at least: (i) dynamically registers and unregisters at least one other runner definition, and (ii) manages execution of the one or more runner definitions and the at least one other runner definition; and plugs the generated first pluggable data analytics engine into the first data analytics platform, wherein the first pluggable data analytics engine thereafter performs one or more data analytics operations.

9. The computing system of claim 8, wherein the Data Analytics Engine Manager further: generates, based on the first definition of the first data engine, the version of the first data analytics engine for the first data analytics platform while still operating on the multiple data analytics platforms.

10. The computing system of claim 8, wherein the Data Analytics Engine Manager further: generates, based on a second obtained engine definition of the second data engine, a version of the second data analytics engine for the second data analytics platform.

11. The computing system of claim 8, wherein the Data Analytics Engine Manager further: generates, based on a second engine definition of the second data engine, a version of the second data analytics engine on the second data analytics platform while still operating on the first data analytics engine of the multiple data analytics platforms.

12. The computing system of claim 8, wherein the Data Analytics Engine Manager further: removes the generated version of the first data analytics engine on the first data analytics platform.

13. The computing system of claim 12, wherein the Data Analytics Engine Manager further: obtains an updated version of the first obtained definition of the first data engine while still operating on the first data analytics engine of the multiple data analytics platforms; and generates, based on the updated version of the first data engine, an updated version of the first data analytics engine for the first data analytics platform, while still operating on the first data analytics engine of the multiple data analytics platforms.

14. A non-transitory computer readable storage medium storing at least executable computer code for managing a data analytics environment that includes multiple data analytics platforms, wherein the multiple data analytics platforms include a first data analytics platform and a second data analytics platform that differ from each other with respect to at least one criterion, wherein the executable computer code includes:

providing a data analytics engine manager, wherein the data analytics manager manages data analytics of the first data analytics platform and the second data analytics platform;

obtaining a first data analytics engine definition that is a definition of a first data analytics engine designated to perform data analytics on the first data analytics platform of the multiple data analytics platforms, the first data analytics engine definition including one or more Application Program Interfaces that define the first data analytics engine, wherein the one or more Application Program Interfaces include one or more declarative application program interfaces each defining multiple resources, wherein the multiple defined resources include: (i) one or more job definitions defining one or more executable jobs that are supported by the first data analytics engine, (ii) one or more artifact definitions including a description of the properties supported by the first data analytics engine and one or more associated validation requirements of the first data analytics engine, (iii) one or more runner definitions executing the job definitions supported by the first data analytics engine, and (iv) one or more runner containers supporting the execution of the job definitions by the one or more runner definitions;

generating, based on the obtained first definition engine, a version of the first data analytics engine for the first data analytics platform, wherein the generating generates the version of the first data analytics engine, at least in part, based on the following: (a) one or more runner definitions, (b) one or more runner containers, (c) one or more job definitions, and (d) one or more artifact definitions, wherein the first data analytics engine includes at least one runner resource manager and at least one runner resource component, wherein the at least one runner resource component is provided as an abstraction of an execution unit of the first data analytics engine of the first pluggable engine and further defines a data analytic environment, including one or more jobs that the data analytics environment supports, and wherein the at least one runner resource manager at least: (i) dynamically registers and unregisters at least one other runner definition, and (ii) manages execution of the one or more runner definitions and the at least one other runner definition;

plugging, by the data analytics engine manager, the generated first pluggable data analytics engine into the first data analytics platform; and thereafter performing, by the generated first pluggable data analytics engine, one or more data analytics operations.

15. The non-transitory computer readable storage medium of claim 14, wherein the generating of the version of the first data analytics engine on the first data analytics platform based on the obtained first definition engine further comprises: generating the first data analytics engine for the first data analytics platform while at least another data engine is operating in the second data analytics platform in the multiple data analytics platforms.

16. The non-transitory computer readable storage medium of claim 14, wherein the executable computer code further includes:

executable computer code to obtain a second data analytics engine definition that is a definition of a second data analytics engine designated to perform data analytics on the second data analytics platform of the multiple data analytics platforms; and executable computer code to generate, based on the obtained second definition engine, a version of the second data analytics engine for the second data analytics platform.

17. The non-transitory computer readable storage medium of claim 16, wherein the generating of the version of the second data analytics engine for the second data analytics platform based on the obtained second definition engine, generates the version of the second data analytics engine while the first data analytics engine is operating for the first data analytics platform of the multiple data analytics platforms.

18. The non-transitory computer readable storage medium of claim 16, wherein the version of the second data analytics engine on the second data analytics platform and the version of the first data analytics engine for the first data analytics platform interchange data between each other.

19. The non-transitory computer readable storage medium of claim 14, wherein the first data analytics engine definition is an updated data analytics engine, and wherein the generating of the version of the first data analytics engine for the first data analytics platform based on the obtained first definition engine further comprises:

determining whether to remove an older version of a data analytics engine on the first data analytics platform;

removing an older version of a data analytics engine on the first data analytics platform when the determining determines to remove an older version of a data analytics engine for the first data analytics platform; and generating the first data analytics engine as an updated version of the older version of the data analytics engine for the first data analytics platform.

20. The non-transitory computer readable storage medium of claim 19, wherein the generating the first data analytics engine as an updated version of the older version of the data analytics engine on the first data analytics platform comprises:

generating the first data analytics engine as an updated version while at least another data engine is operating for the second data analytics platform of the multiple data analytics platforms.

* * * * *